United States Patent
Taguchi et al.

(10) Patent No.: US 10,611,557 B2
(45) Date of Patent: Apr. 7, 2020

(54) STRUCTURE OF NOZZLE FOR FLUID TANK PIPING

(71) Applicant: The Yokohama Rubber Co., LTD., Minato-ku, Tokyo (JP)

(72) Inventors: Yuji Taguchi, Hiratsuka (JP); Hiroshi Hagiwara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 347 days.

(21) Appl. No.: 15/506,460

(22) PCT Filed: Jul. 23, 2015

(86) PCT No.: PCT/JP2015/070907
§ 371 (c)(1),
(2) Date: Feb. 24, 2017

(87) PCT Pub. No.: WO2016/031446
PCT Pub. Date: Mar. 3, 2016

(65) Prior Publication Data
US 2018/0222669 A1   Aug. 9, 2018

(30) Foreign Application Priority Data

Aug. 25, 2014 (JP) ................................ 2014-170293

(51) Int. Cl.
*F17C 1/00* (2006.01)
*F17C 13/00* (2006.01)
(Continued)

(52) U.S. Cl.
CPC .......... *B65D 88/54* (2013.01); *B64D 11/0007* (2013.01); *B65D 25/42* (2013.01);
(Continued)

(58) Field of Classification Search
USPC .......... 285/197, 198, 199, 148.28, 202, 204, 285/205, 206, 219; 220/86.1, 581, 661,
(Continued)

(56) References Cited

U.S. PATENT DOCUMENTS 978,504 A * 12/1910 Stewart ................. F16L 41/001
285/209
1,049,283 A * 12/1912 Westphal .............. F16L 41/001
285/209
(Continued)

FOREIGN PATENT DOCUMENTS

| EP | 2 282 097 | 2/2011 |
|---|---|---|
| GB | 963793 | 7/1964 |

(Continued)

OTHER PUBLICATIONS

International Search Report for International Application No. PCT/JP2015/070907 dated Oct. 13, 2015, 2 pages, Japan.

*Primary Examiner* — Gideon R Weinerth
(74) *Attorney, Agent, or Firm* — Thorpe North & Western

(57) ABSTRACT

A structure whereby a piping nozzle can be simply attached to a tank body is disclosed. A cylinder of a nozzle body is inserted through the interior and exterior of the tank body via a nozzle body insertion hole in the tank body. A skirt is provided on an end portion of the cylinder, and expands annularly from the end portion of the cylinder in the interior of the tank body. A sealing member is interposed between an inner surface of the tank body and the skirt around the nozzle body insertion hole. A spacer member is disposed on an outer surface of the tank body around the cylinder. By tightening a nut on a male screw of the cylinder of the nozzle body, a portion of the tank body around the nozzle body insertion hole is sandwiched by the skirt of the nozzle body and the spacer member.

10 Claims, 12 Drawing Sheets

(51) Int. Cl.
- B65D 6/00 (2006.01)
- B65D 88/54 (2006.01)
- B65D 25/42 (2006.01)
- B65D 90/00 (2006.01)
- F16L 41/14 (2006.01)
- B64D 11/00 (2006.01)

(52) U.S. Cl.
CPC .............. B65D 90/00 (2013.01); F16L 41/14 (2013.01); *F17C 2205/0305* (2013.01); *Y10T 137/0458* (2015.04)

(58) Field of Classification Search
USPC .......................................... 220/304; 206/0.6
See application file for complete search history.

(56) References Cited

U.S. PATENT DOCUMENTS

| | | | | |
|---|---|---|---|---|
| 2,200,162 A * | 5/1940 | De Vulitch | ............ | B21D 51/24 228/154 |
| 2,710,630 A | 6/1955 | Greer | | |
| 2,827,195 A * | 3/1958 | Kearns | ...................... | F17C 1/04 220/590 |
| 2,936,787 A * | 5/1960 | Mercier | .................... | F15B 1/22 138/30 |
| 3,016,248 A | 1/1962 | Lindberg | | |
| 3,061,338 A * | 10/1962 | Clark | ...................... | H02G 3/083 285/202 |
| 3,419,173 A * | 12/1968 | Verlinden | .............. | B65D 11/06 220/304 |
| 3,694,009 A * | 9/1972 | Phillips | .................. | F16L 41/06 285/197 |
| 4,285,109 A * | 8/1981 | Kautzer | ............... | B21D 26/029 285/206 |
| 4,613,169 A * | 9/1986 | Engelhart | ............... | F16L 41/14 261/DIG. 75 |
| 4,614,279 A * | 9/1986 | Toth | ...................... | B29C 53/602 156/173 |
| 4,765,507 A * | 8/1988 | Yavorsky | ................ | B29C 70/86 137/590 |
| 5,755,425 A | 5/1998 | Marolda | | |
| 8,870,231 B2 * | 10/2014 | Kawasetsu | ............. | B01D 61/10 285/204 |
| 2003/0178843 A1 | 9/2003 | Mcaliley | | |
| 2004/0041397 A1 * | 3/2004 | Murphy | ................ | F16L 41/082 285/197 |
| 2005/0006393 A1 * | 1/2005 | Carter | ................... | B29C 70/086 220/581 |
| 2008/0030021 A1 * | 2/2008 | Theilen | ................ | A01G 25/092 285/5 |
| 2011/0031740 A1 | 2/2011 | Stone | | |
| 2012/0080879 A1 * | 4/2012 | Gauthier | ................ | F16L 41/14 285/197 |
| 2013/0187376 A1 * | 7/2013 | Williams | ................ | F16L 41/08 285/197 |
| 2015/0001229 A1 * | 1/2015 | Helmig | .................... | F17C 1/06 220/592 |
| 2016/0257403 A1 * | 9/2016 | Masuda | ............... | B29D 22/003 |
| 2018/0142839 A1 * | 5/2018 | Taguchi | ................. | B65D 88/14 |

FOREIGN PATENT DOCUMENTS

| | | |
|---|---|---|
| JP | 2011-251736 | 12/2011 |
| JP | 2014-051309 | 3/2017 |

* cited by examiner

STRUCTURE OF NOZZLE FOR FLUID TANK PIPING

TECHNICAL FIELD

The present technology relates to a structure of a nozzle for fluid tank piping.

BACKGROUND ART

A fluid tank provided with a tank body, mouthpieces, and lids has previously been proposed as an aircraft water tank. The tank body includes a cylindrical section and dome sections provided on both sides of the cylindrical section. The mouthpieces is provided in the centers of the dome sections, and are in communication with the internal space of the tank body. The lids are configured to open and close the mouthpieces.

The cylindrical section of the tank body is provided with, for example, a piping nozzle for injecting water into the internal space; and a piping nozzle for supplying the water in the internal space to various places of the aircraft.

The piping nozzles are provided with a nozzle main body insertion hole provided in the cylindrical section; a nozzle main body; and a covering.

The nozzle main body includes a first cylindrical portion inserted through the interior and exterior of the tank body via the nozzle main body insertion hole; and a skirt portion provided at an end portion of the first cylindrical portion, that expands annularly from the end portion of the cylindrical portion in the interior of the tank body.

The covering includes a second cylindrical portion outside the tank body, through which the first cylindrical portion is inserted; and a flange portion that expands annularly from a base portion of the second cylindrical portion.

Additionally, the nozzle main body is attached to the tank body as follows.

First, an adhesive is applied to the skirt portion of the nozzle main body and the area around the nozzle main body insertion hole of the inner surface of the tank body. Additionally, an adhesive is applied to the flange portion of the covering and the area around the nozzle main body insertion hole of the outer surface of the tank body.

Next, the first cylindrical portion of the nozzle main body is inserted through the nozzle main body insertion hole from the interior of the tank body, and the skirt portion is pressed against the inner surface of the tank body.

Then, the second cylindrical portion is inserted into the first cylindrical portion, and the flange portion is pressed against the outer surface of the tank body.

This pressed state is maintained and the adhesive is cured.

Additionally, from the perspective of food hygiene, in order to prevent the adhesive from contacting the water, a coating material, which may contact water without causing any problems, is applied in the interior of the tank body at the boundary between the skirt portion and the inner surface of the tank body, thus covering the adhesive.

Conventional fluid tanks have various deficiencies. For example:

1) The nozzle main body is attached to the tank body using an adhesive and, as such, the work of applying the adhesive and the work of applying the coating material is labor intensive. Moreover, curing of the adhesive takes time and, during the curing of the adhesive, pressure is required to be applied to the nozzle main body and the covering. Consequently, it is difficult to improve efficiency of the work of attaching the piping nozzle.

2) The temperature and humidity suited for the curing of the adhesive is required to be managed. Consequently, locations are limited where attaching work of the piping nozzle can be performed.

3) Labor to accurately position the piping nozzle at the time of adhesion such that position shifts of the nozzle main body with respect to the tank body do not occur is cumbersome. Additionally, when a position shift does occur, a great deal of effort is needed to redo the adhering. Consequently, it is difficult to improve efficiency of the work of attaching the piping nozzle.

4) The adhesive and coating material described above are used and, as such, it is difficult to simply repair the piping nozzle. Rather, the entire fluid tank is required to be transported to the factory and repaired. Consequently, the piping nozzle cannot be simply repaired.

SUMMARY

The present technology provides a structure of a nozzle for fluid tank piping advantageous in that the attaching can be performed in a short amount of time without limitations to the work location, and repairs can be simply performed.

The technology includes is a structure of a nozzle for piping to be provided in a tank body of a fluid tank. The structure includes a nozzle body, a sealing member, and a spacer. The nozzle body includes a cylinder inserted through an interior and an exterior of the tank body via a nozzle body insertion hole in the tank body and including a male screw formed in a portion exposed to the exterior of the tank body, and a skirt provided on an end portion of the cylinder and expanding annularly from the end portion of the cylinder in the interior of the tank body. The sealing member is interposed between an inner surface of the tank body and the skirt around a periphery of the nozzle body insertion hole. The spacer member with an annular shape is disposed around the cylinder on an outer surface of the tank body. In this structure, a portion of the tank body around the nozzle body insertion hole is sandwiched by the skirt and the spacer member due to a nut being tightened onto the male screw.

According to the technology, the skirt includes a skirt side abutting surface abuttable against the inner surface of the tank body around the nozzle body insertion hole. The sealing member is disposed between the inner surface of the tank body and the skirt side abutting surface. The spacer member includes a spacer member side abutting surface abuttable against the outer surface of the tank body around the nozzle body insertion hole. Sandwiching of the portion of the tank body around the nozzle body insertion hole is done by the skirt side abutting surface and the spacer member side abutting surface.

According to the technology, the tank body includes a cylindrical section and dome sections provided on both sides of the cylindrical section. The nozzle body insertion hole is provided in the cylindrical section. The skirt side abutting surface is formed with a cylindrical surface of a same curvature as the inner surface of the cylindrical section. The spacer member side abutting surface is formed with a cylindrical surface of a same curvature as the outer surface of the cylindrical section.

According to the technology, a portion of the skirt positioned on a side opposite the skirt side abutting surface is formed with a cylindrical surface with a same axial center as the skirt side abutting surface.

According to the technology, the sealing member is an O-ring. A groove extending annularly around the cylinder is defined in the skirt side abutting surface. The O-ring is fitted into the groove.

According to the technology, the sealing member is an annular plate-like rubber sheet having a uniform thickness and extending annularly between the inner surface of the tank body and the skirt side abutting surface.

According to the technology, the spacer member includes a flat nut side abutting surface positioned opposite the spacer member side abutting surface and abuttable against the nut.

According to the technology, an inner circumferential surface side engaging portion is provided in an inner circumferential surface of the nozzle body insertion hole. An outer circumferential surface side engaging portion is provided on the outer circumferential surface of the cylinder. The outer circumferential surface side engaging portion is configured to engage with the inner circumferential surface side engaging portion and stop rotation of the cylinder within the nozzle body insertion hole.

According to the technology, the inner circumferential surface side engaging portion is constituted by a recess provided in the inner circumferential surface of the nozzle body insertion hole. The outer circumferential surface side engaging portion is constituted by a protrusion provided on the outer circumferential surface of the cylinder and engageable with the recess.

According to the technology, a plurality of the recesses are provided at a spacing in a circumferential direction of the inner circumferential surface of the nozzle body insertion hole. A plurality of the outer circumferential surface side engaging portions are provided at a spacing in a circumferential direction of the outer circumferential surface of the cylinder and engageable with the plurality of the recesses.

According to the technology, the spacer member includes a center hole for which the cylinder is inserted through a center of the spacer member. A recess engageable with the protrusion constituting the outer circumferential surface side engaging portion is provided on an inner circumferential surface of the center hole.

According to the technology, the nut is tightened on the male screw of the cylinder of the nozzle body. As such, the portion of the tank body around the nozzle body insertion hole is sandwiched by the spacer member and the skirt of the nozzle body. As a result, the piping nozzle can be provided on the tank body.

Accordingly, the nozzle body can be provided on the tank body without using an adhesive, as is conventional.

As such, the work of applying the adhesive and the work of applying the coating material is unnecessary and, moreover, curing time of the adhesive can be eliminated and it is not necessary to apply pressure to the nozzle main body and the spacer member during the curing of the adhesive, which is advantageous from the perspective of improving the efficiency of the work of attaching the piping nozzle.

Additionally, because the adhesive is no longer necessary, there is no need to manage the temperature and humidity suited for the curing of the adhesive. As such, locations where attaching work of the piping nozzle can be performed are not limited.

Additionally, when the nozzle body is attached to the tank body by tightening the nut, even if a position shift of the nozzle body with respect to the tank body occurs, the attaching can be simply redone by loosening the nut, which is advantageous from the perspective of improving the efficiency of the work of attaching the piping nozzle.

Additionally, because the piping nozzle is attached using a screw connection between the male screw and the nut, the piping nozzle can be simply repaired at the site where the fluid tank is installed, which is advantageous from the perspective of improving the efficiency of the work of repairing the piping nozzle.

According to the technology, a uniform force is applied to the portion of the tank body around the nozzle body insertion hole by the skirt side abutting surface and the spacer member side abutting surface, and localized forces are not applied to the portion of the tank body. This is advantageous from the perspective of firmly attaching the nozzle body to the portion of the tank body without causing breakage or deterioration of the tank body portion.

According to the technology, localized forces are not applied to the portion of the tank body, which is advantageous from the perspective of firmly attaching the nozzle body to the portion of the tank body without causing breakage or deterioration of the tank body portion.

According to the technology, the thickness of the skirt is reduced, which is advantageous from the perspective of reducing the weight of the fluid tank.

According to the technology, the O-ring can simply be installed by fitting the O-ring into the groove when the nozzle body is attached to the tank body.

According to the technology, the rubber sheet can simply be disposed by mounting the rubber sheet on the skirt side abutting surface when the nozzle body is attached to the tank body.

According to the technology, the tightening force of the nut is uniformly and reliably transmitted via the spacer member to the portion of the tank body around the nozzle body insertion hole, which is advantageous from the perspective of firmly attaching the nozzle body to the portion of the tank body.

According to the technology, the nozzle body is accurately positioned with respect to the tank body about the axis of the nozzle body, which is advantageous from the perspective of improving the efficiency of the work of attaching the nozzle body to the tank body.

According to the technology, the rotation of the cylinder within the nozzle body insertion hole is reliably stopped with a simple structure, which is advantageous.

According to the technology, the number of recesses and protrusions can be increased or decreases in accordance with the rotational torque to be applied to the nozzle body when piping.

According to the technology, the nozzle body can be attached more firmly, which is advantageous.

DETAILED DESCRIPTION

First Embodiment

Next, embodiments of the present technology will be described with reference to the drawings.

Figure 1:
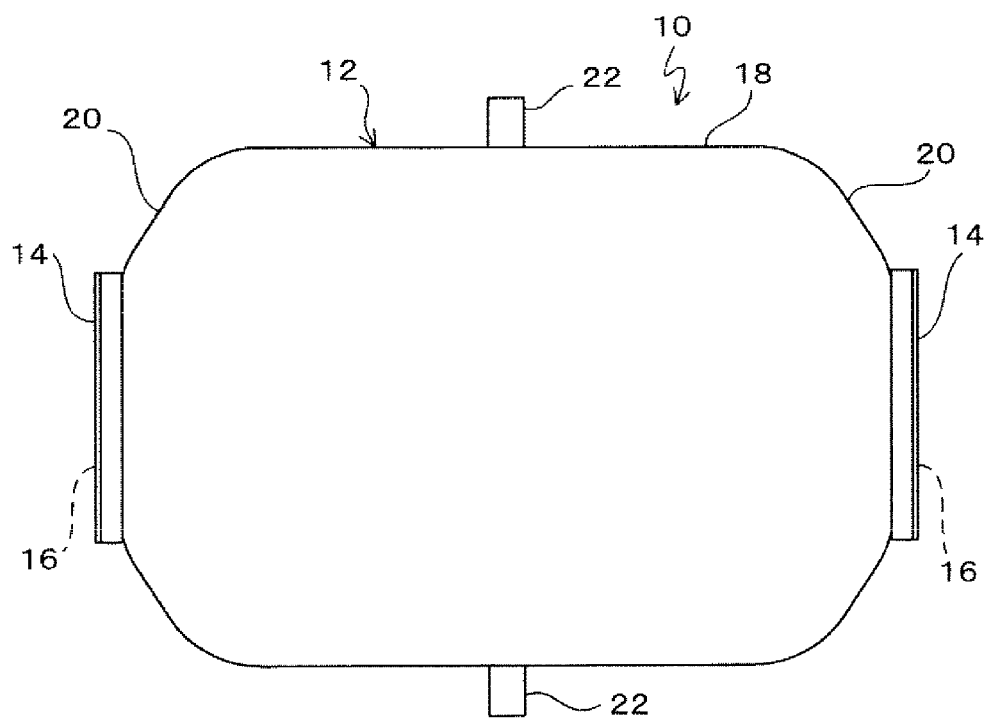
FIG. 1 is a front view of a fluid tank to which a structure of a piping nozzle according to a first embodiment is applied.

As illustrated in FIG. 1, in the present embodiment, a case will be described in which a fluid tank 10 is an aircraft water tank that is installed on an aircraft and stores drinking water.

The fluid tank 10 includes a tank body 12, mouthpieces 14, and lids 16.

The tank body 12 includes a cylindrical section 18, and dome sections 20 provided on both sides of the cylindrical section 18.

Figure 2:
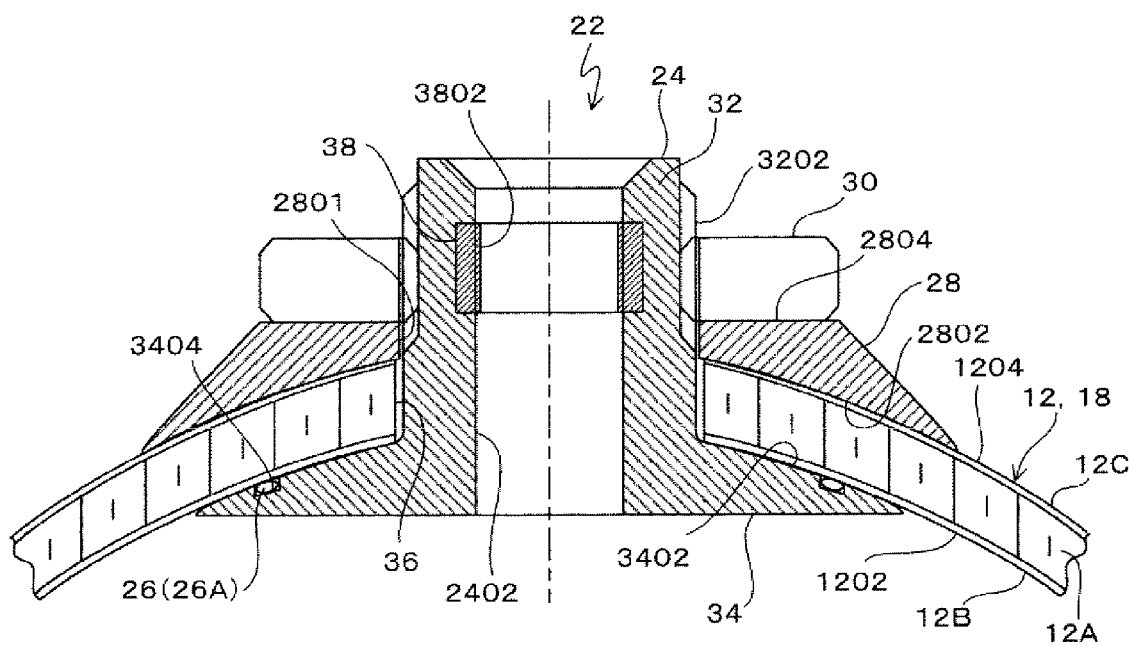
FIG. 2 is a cross-sectional view illustrating a configuration of the piping nozzle according to the first embodiment.

As illustrated in FIG. 2, the tank body 12 includes, for example, a core layer 12A forming an internal space, and fiber-reinforced resin layers 12B and 12C that cover an inner surface and an outer surface of the core layer 12A.

The fiber-reinforced resin layers 12B and 12C are formed via a filament winding method in which reinforcing fibers (filaments) impregnated with a thermosetting resin are used.

Various conventionally known synthetic resins such as epoxy resin can be used as the thermosetting resin. Various conventionally known fibers such as carbon fibers or glass fibers can be used as the reinforcing fibers.

The mouthpieces 14 are attached to openings formed in centers of the dome sections 20, and inner circumferences of the mouthpieces 14 are in communication with the internal space of the tank body 12. The mouthpieces 14 are for performing cleaning of the interior of the tank body 12.

The lids 16 are removably attached to the mouthpieces 14, and the mouthpieces 14 are closed by the lids 16 when the fluid tank 10 is in use.

A plurality of piping nozzles 22 are provided on the cylindrical section 18. These piping nozzles 22 are, for example, nozzles for attaching cabin supply piping for supplying water in the fluid tank 10 to the various places of the cabin, nozzles for attaching water injection piping for injecting water into the fluid tank 10, nozzles for attaching pressure adjustment piping for adjusting pressure within the fluid tank 10, nozzles for attaching sensors for detecting the height of the liquid surface within the fluid tank 10, or the like.

As illustrated in FIG. 2, these piping nozzles 22 include a nozzle body 24, a sealing member 26, a spacer member 28, and a nut 30.

Figure 4A:
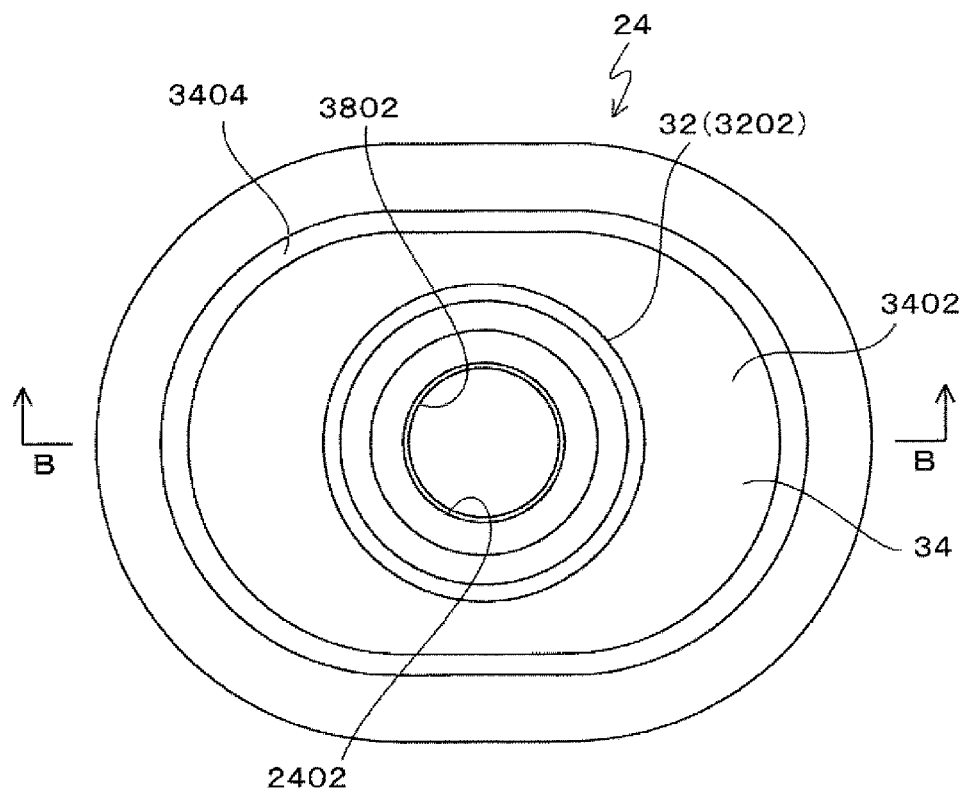
FIG. 4A is a plan view of a nozzle body according to the first embodiment.
Figure 4B:
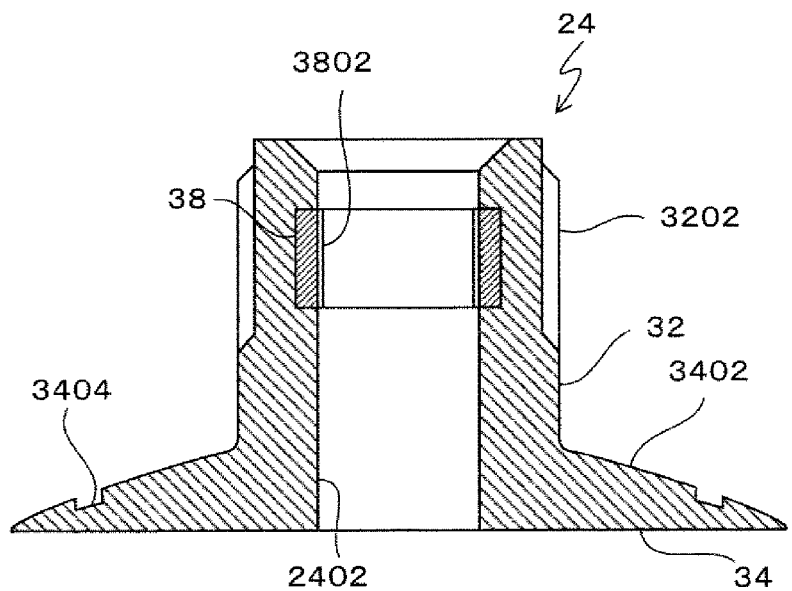
FIG. 4B is a cross-sectional view taken along line B-B in FIG. 4A.

As illustrated in FIG. 2 and FIGS. 4A and 4B, the nozzle body 24 is provided with a cylinder 32 and a skirt 34, and is formed from a synthetic resin material.

A center hole 2402 is defined in the nozzle body 24 from the center of the cylinder 32 to the center of the skirt 34.

The cylinder 32 is inserted through the interior and the exterior of the tank body 12 via a nozzle body insertion hole 36 defined penetrating through the tank body 12. A male screw 3202 is formed in an outer circumferential surface portion of the cylinder 32 that is exposed to the exterior of the tank body 12.

Additionally, a metal female screw member 38 in which a female screw 3802 is formed is embedded in an inner circumferential surface of the center hole 2402 in the cylinder 32. The female screw member 38 is for joining to a pipe (not illustrated).

The skirt 34 is provided on an end portion of the cylinder 32, and expands annularly from the end portion of the cylinder 32 in the interior of the tank body 12.

The skirt 34 includes a skirt side abutting surface 3402 abuttable against an inner surface 1202 of the tank body 12 around the nozzle body insertion hole 36.

In the present embodiment, the nozzle body insertion hole 36 is defined in the cylindrical section 18 of the tank body 12 and, as such, the inner surface 1202 of the tank body 12 around the nozzle body insertion hole 36 is a cylindrical surface. Therefore, the skirt side abutting surface 3402 is formed with a cylindrical surface of substantially the same curvature as the inner surface 1202 of the cylindrical section 18.

As illustrated in FIG. 2, the sealing member 26 is interposed between the inner surface 1202 of the tank body 12 and the skirt 34, around the nozzle body insertion hole 36. In the present embodiment, the sealing member 26 is disposed between the inner surface 1202 of the tank body 12 and the skirt side abutting surface 3402.

The sealing member 26 is for hermetically and fluid tightly joining the inner surface 1202 of the tank body 12 and the skirt side abutting surface 3402 around the nozzle body insertion hole 36.

As illustrated in FIG. 2, an O-ring 26A can be used as the sealing member 26. In this case, an annular groove 3404 (see FIGS. 4A and 4B) into which the O-ring 26A fits is defined in the skirt side abutting surface 3402 of the skirt 34.

Figure 3:
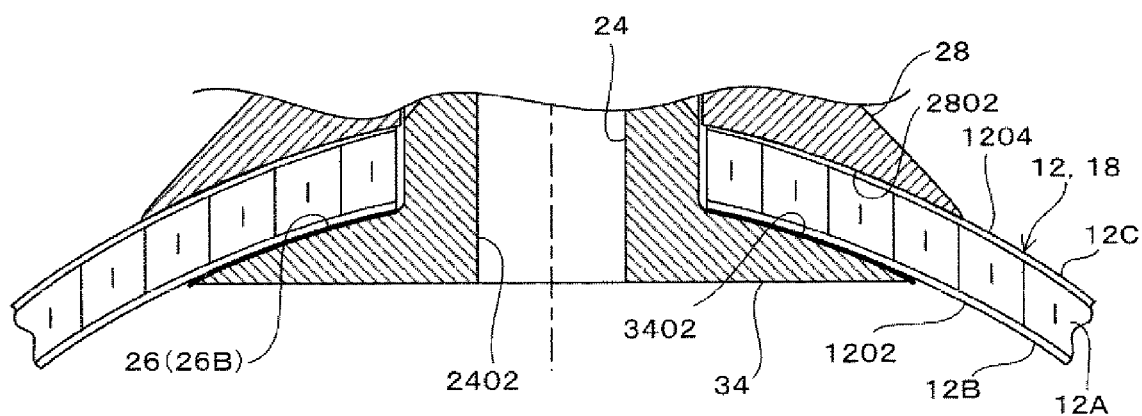
FIG. 3 is a cross-sectional view illustrating a configuration of a piping nozzle of a modified example.

Additionally, as illustrated in FIG. 3, an annular plate-like rubber sheet 26B with a uniform thickness can be used as the sealing member 26. In this case, the rubber sheet 26B is mounted on the skirt side abutting surface 3402.

Note that the sealing member 26 is not limited to the O-ring 26A and the rubber sheet 26B and products of various conventionally known materials and structures which, from the perspective of food hygiene, may contact water without causing any problems, may be used.

Figure 5A:
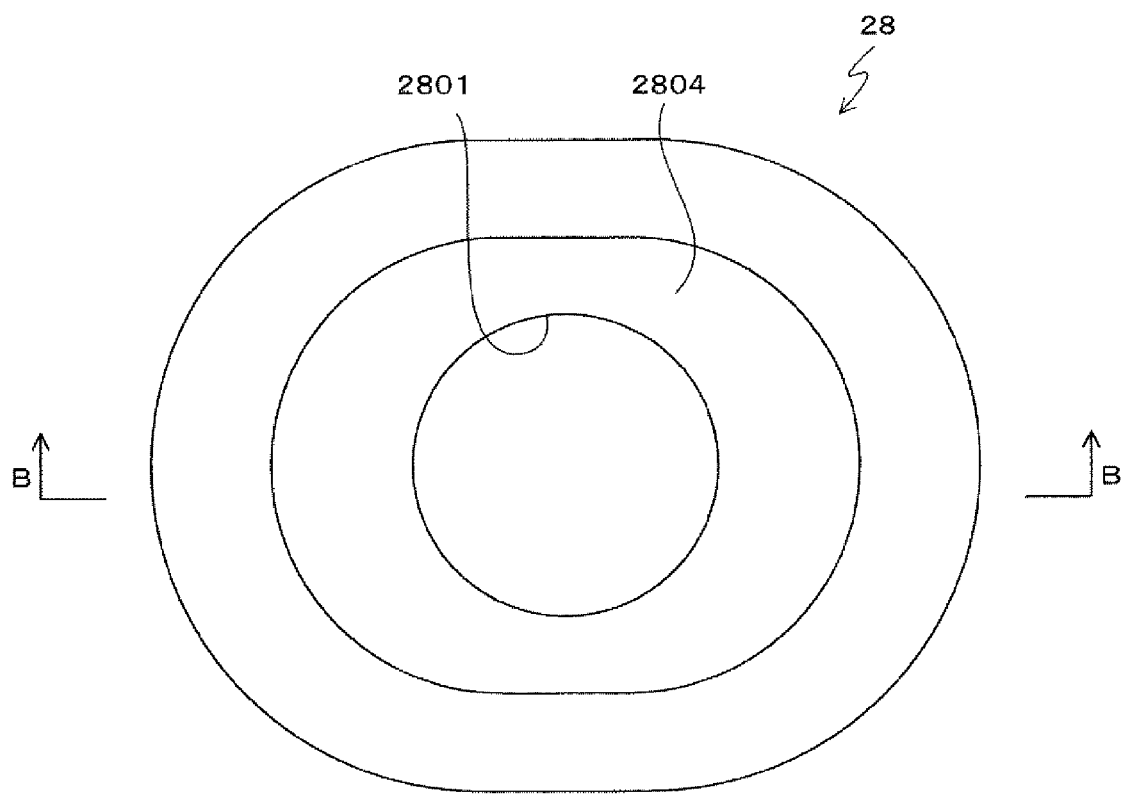
FIG. 5A is a plan view of a spacer member according to the first embodiment.
Figure 5B:
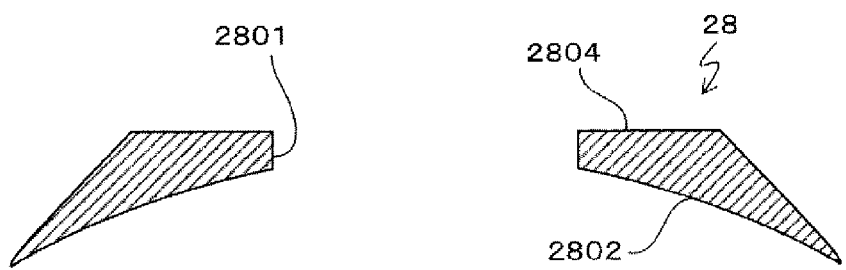
FIG. 5B is a cross-sectional view taken along line B-B in FIG. 5A.
Figure 6:
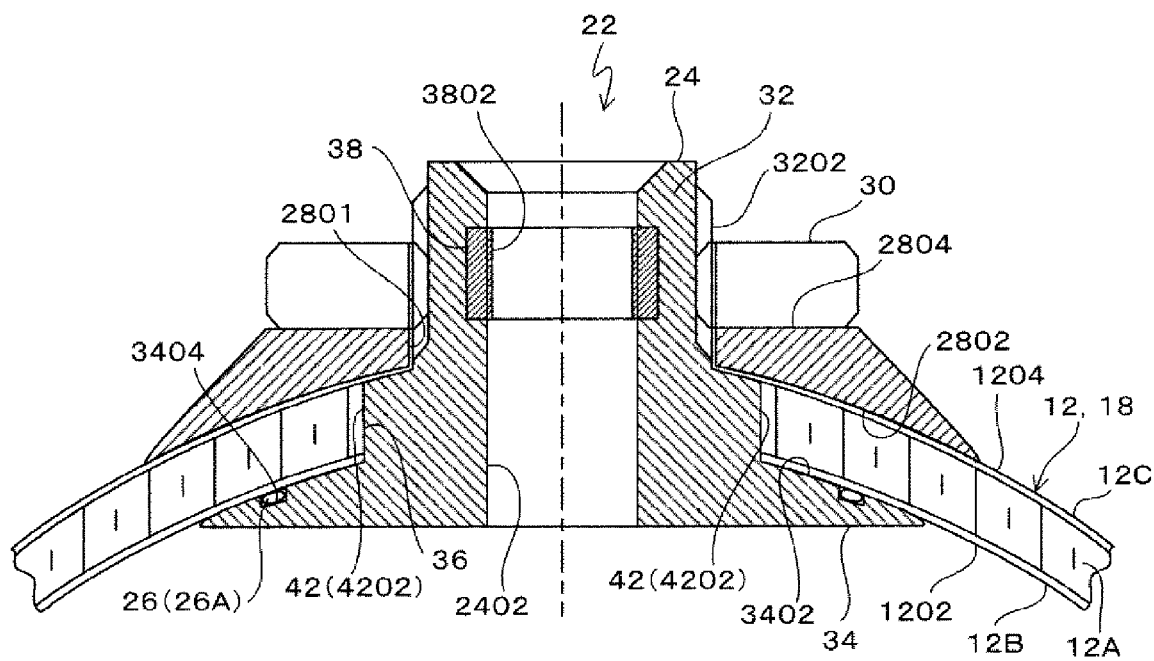
FIG. 6 is a cross-sectional view illustrating a configuration of a piping nozzle according to a second embodiment.
Figure 7A:
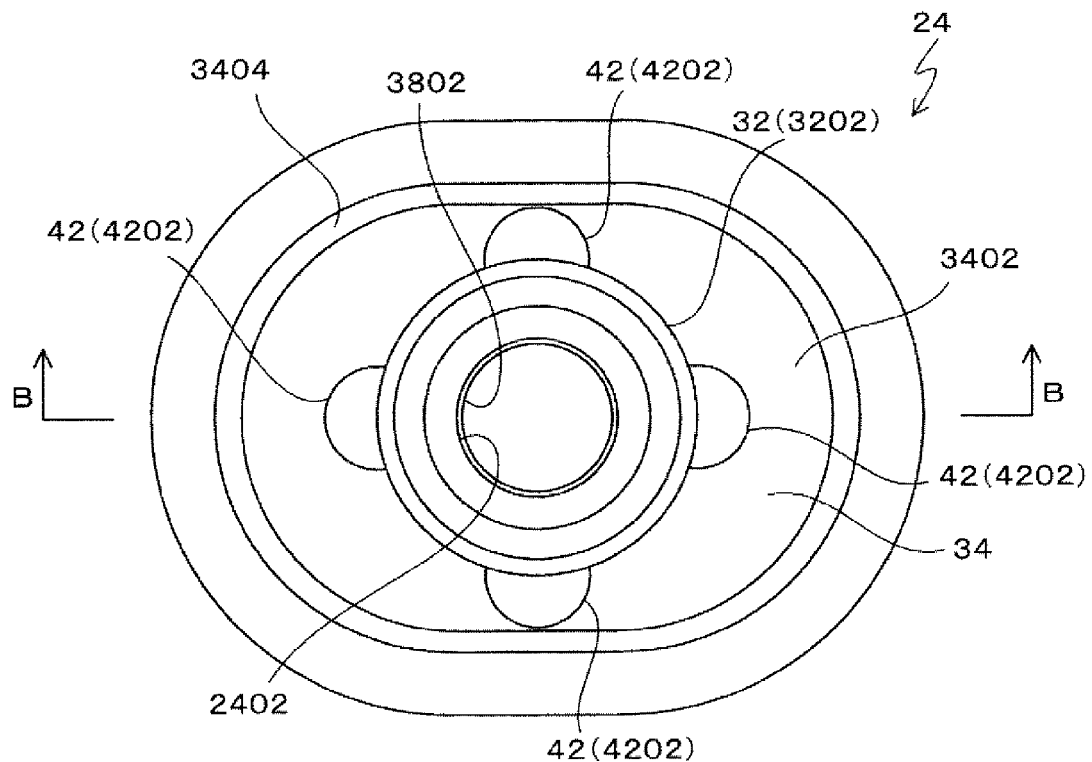
FIG. 7A is a plan view of a nozzle body according to the second embodiment.
Figure 7B:
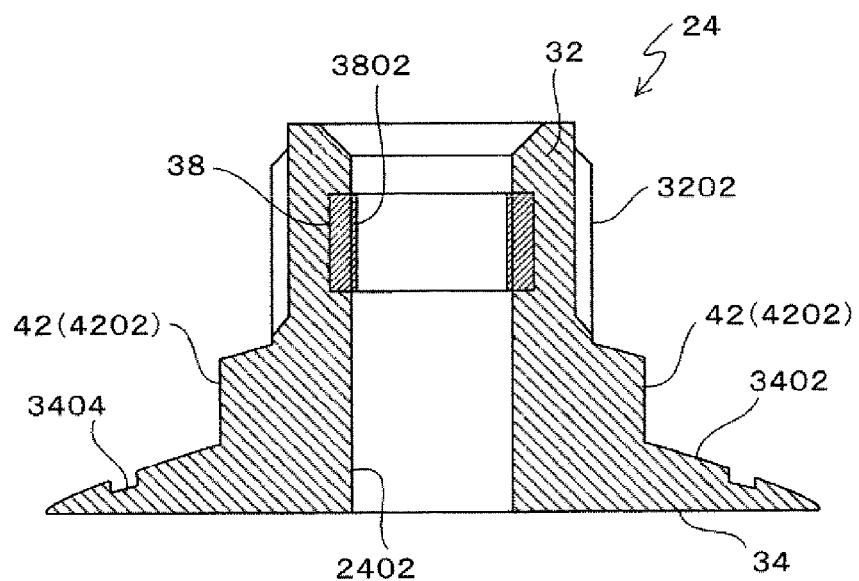
FIG. 7B is a cross-sectional view taken along line B-B in FIG. 7A.

As illustrated in FIG. 2 and FIGS. 5A and 5B, the spacer member 28 has an annular shape and is disposed around the cylinder 32 on the outer surface of the tank body 12, and a center hole 2801 for which the cylinder 32 is inserted through a center of the spacer member 28 is defined in the spacer member 28.

The spacer member 28 includes a spacer member side abutting surface 2802 abuttable against an outer surface 1204 of the tank body 12 around the nozzle body insertion hole 36, and a nut side abutting surface 2804 positioned opposite the spacer member side abutting surface 2802 and abuttable against the nut 30.

In the present embodiment, the nozzle body insertion hole 36 is defined in the cylindrical section 18 of the tank body 12 and, as such, the outer surface 1204 of the tank body 12 around the nozzle body insertion hole 36 is a cylindrical surface. Therefore, the spacer member side abutting surface 2802 is formed with a cylindrical surface of substantially the same curvature as the outer surface 1204 of the cylindrical section 18.

Additionally, the nut side abutting surface 2804 is formed with a flat surface.

The nut 30 is for being tightened on the male screw 3202 of the cylinder 32, and abuts against the nut side abutting surface 2804 of the spacer member 28.

By tightening the nut 30 on the male screw 3202, the portion of the tank body 12 around the nozzle body insertion hole 36 is sandwiched by the skirt 34 and the spacer member 28.

In the present embodiment, the sandwiching of the portion of the tank body 12 around the nozzle body insertion hole 36 is done by the skirt side abutting surface 3402 and the spacer member side abutting surface 2802.

Next, attaching of the piping nozzle 22 is described. The nozzle body 24 is placed in the interior of the tank body 12 through the mouthpiece 14, and the cylinder 32 of the nozzle body 24 is inserted through the nozzle body insertion hole 36. Thus, the cylinder 32 is made to protrude out of the tank body 12.

At this time, the O-ring 26A is fitted into the annular groove 3404 or, alternately, the rubber sheet 26B is mounted on the skirt side abutting surface 3402. Thus, the sealing member 26 is interposed between the inner surface 1202 of the tank body 12 and the skirt side abutting surface 3402.

Next, after the spacer member 28 is inserted through the cylinder 32 protruding out of the tank body 12, the nut 30 is screwed onto the male screw 3202 of the cylinder 32. At this time, the nut 30 is not completely tightened.

Then, the nozzle body 24 is positioned with respect to the tank body 12 such that the axis line of the nozzle body 24 is orthogonal to the axis line of the tank body 12.

Once the positioning of the nozzle body 24 is completed, the nut 30 is tightened on the male screw 3202 of the cylinder 32 and completely tightened.

As a result, the portion of the tank body 12 around the nozzle body insertion hole 36 is sandwiched by the skirt side abutting surface 3402 and the spacer member side abutting surface 2802, and the space between the tank body 12 and the skirt 34 is sealed by the sealing member 26, namely the O-ring 26A or the rubber sheet 26B.

The piping nozzle 22 is attached as described above.

As described above, according to the present embodiment, the nut 30 is tightened on the male screw 3202 of the cylinder 32 of the nozzle body 24. As such, the portion of the tank body 12 around the nozzle body insertion hole 36 is sandwiched by the spacer member 28 and the skirt 34 of the nozzle body 24. As a result, the piping nozzle 22 can be provided on the tank body 12.

Accordingly, in contrast with conventional art, the nozzle body 24 can be provided on the tank body 12 without using an adhesive.

As such, the work of applying the adhesive and the work of applying the coating material is unnecessary and, moreover, curing time of the adhesive can be eliminated and it is not necessary to apply pressure to the nozzle body 24 and the spacer member 28 during the curing of the adhesive, which is advantageous from the perspective of improving the efficiency of the work of attaching the piping nozzle 24.

Additionally, because the adhesive is no longer necessary, there is no need to manage the temperature and humidity suited for the curing of the adhesive. As such, locations where attaching work of the piping nozzle 22 can be performed are not limited.

Additionally, when the nozzle body 24 is attached to the tank body 12 by tightening the nut 30, even if a position shift of the nozzle body 24 with respect to the tank body 12 occurs, the attaching can be simply redone by loosening the nut 30, which is advantageous from the perspective of improving the efficiency of the work of attaching the piping nozzle 22.

Additionally, because a screw connection between the nut 30 and the male screw 3202 is used, the piping nozzle 22 can be simply repaired at the site where the fluid tank 10 is installed, which is advantageous from the perspective of improving the efficiency of the work of repairing the piping nozzle 22.

That is, the structure of the piping nozzle 22 of the fluid tank 10 according to the present embodiment is advantageous from the perspectives of being able to perform the attaching in a short amount of time without limitations to the work location, and simply performing repairs.

Additionally, in the present embodiment, a configuration is given in which the portion of the tank body 12 around the nozzle body insertion hole 36 is sandwiched by the skirt side abutting surface 3402 and the spacer member side abutting surface 2802.

Accordingly, a uniform force is applied to the portion of the tank body 12 around the nozzle body insertion hole 36 by the skirt side abutting surface 3402 and the spacer member side abutting surface 2802, and localized forces are not applied to the portion of the tank body 12. This is advantageous from the perspective of firmly attaching the nozzle body 24 to the portion of the tank body 12 without causing breakage or deterioration of the portion of the tank body 12.

Additionally, in the present embodiment, the spacer member 28 includes the flat nut side abutting surface 2804 positioned opposite the spacer member side abutting surface 2802 and abuttable against the nut 30.

Accordingly, the tightening force of the nut 30 is uniformly and reliably transmitted via the skirt 34 and the spacer member 28 to the portion of the tank body 12 around the nozzle body insertion hole 36, which is advantageous from the perspective of firmly attaching the nozzle body 24 to the portion of the tank body 12.

Second Embodiment

Next, a second embodiment will be described.

Note that this explanation shall emphasize differences from the first embodiment. Therefore, portions and members that are the same as in the first embodiment are assigned the same reference numerals and their explanations shall be omitted.

As illustrated in FIG. 6, FIGS. 7A and 7B, and FIG. 8, the second embodiment differs from the first embodiment in that rotation of the cylinder 32 of the nozzle body 24 within the nozzle body insertion hole 36 is stopped.

Figure 8:
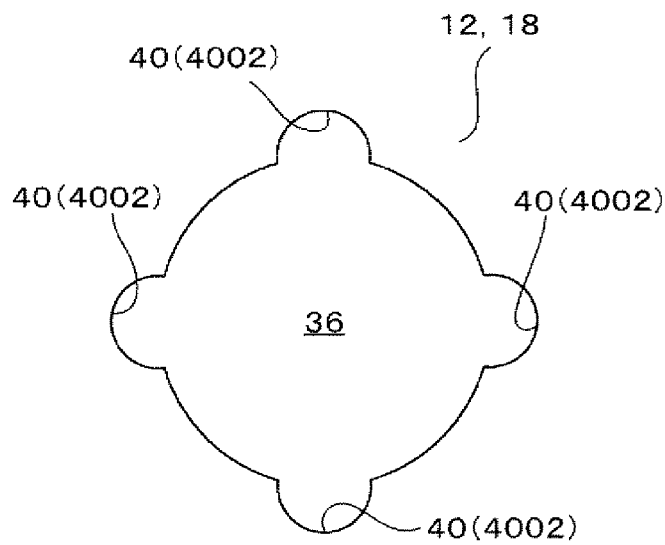
FIG. 8 is a plan view of a nozzle body insertion hole according to the second embodiment.
Figure 9:
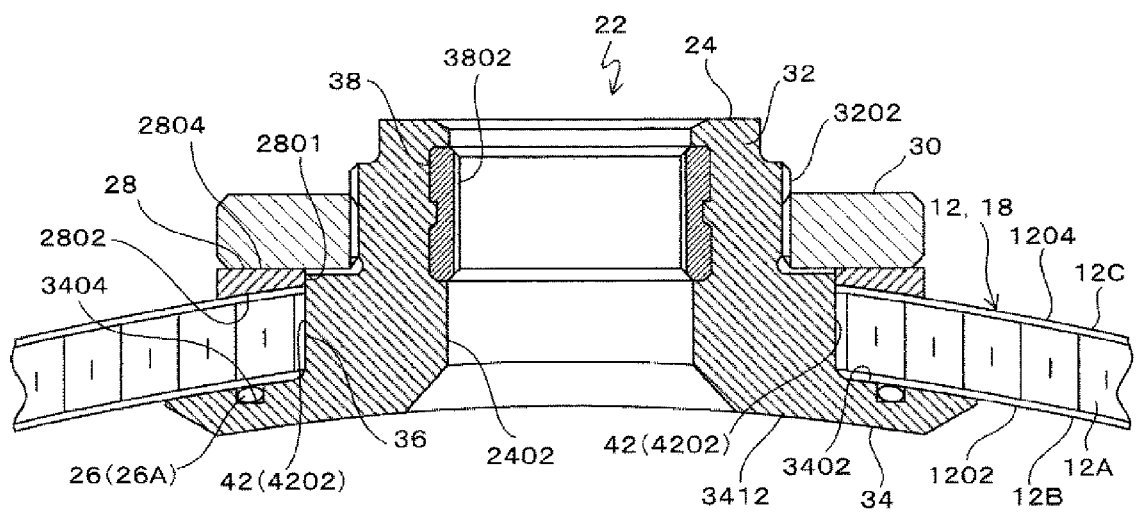
FIG. 9 is a cross-sectional view illustrating a configuration of a piping nozzle according to a third embodiment.
Figure 10A:
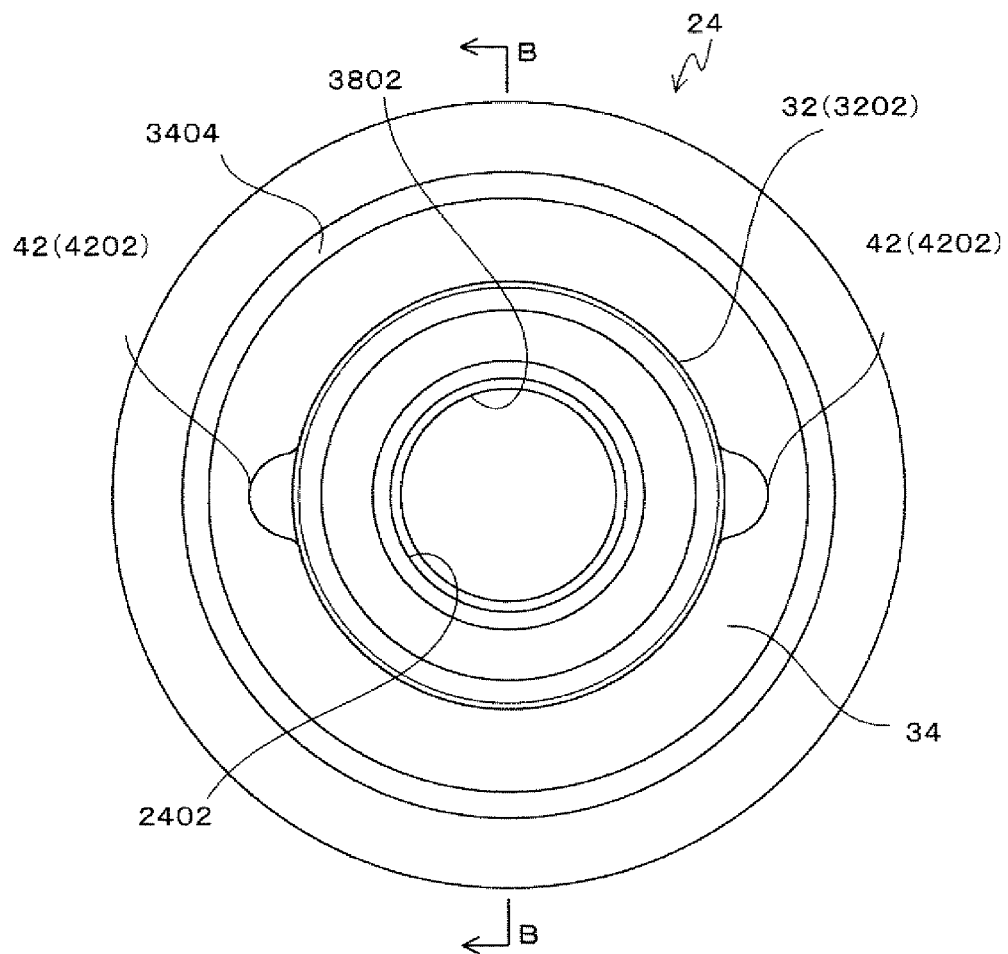
FIG. 10A is a plan view of a nozzle body according to the third embodiment.
Figure 10B:
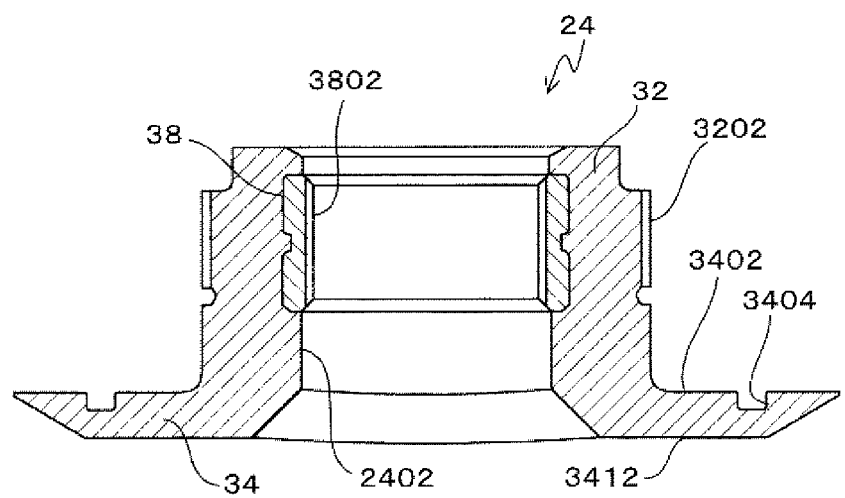
FIG. 10B is a cross-sectional view taken along line B-B in FIG. 10A.
Figure 11A:
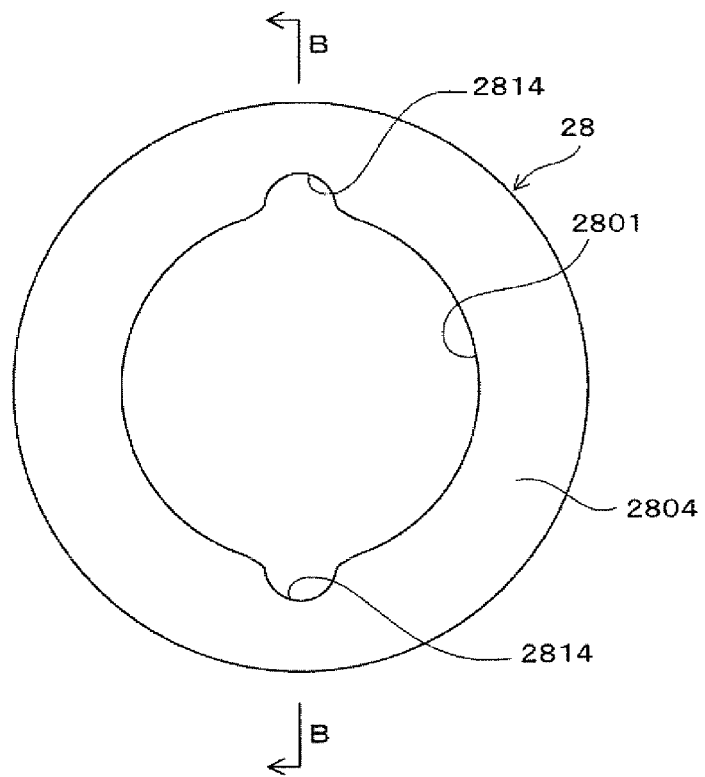
FIG. 11A is a plan view of a spacer member according to the third embodiment.
Figure 11B:
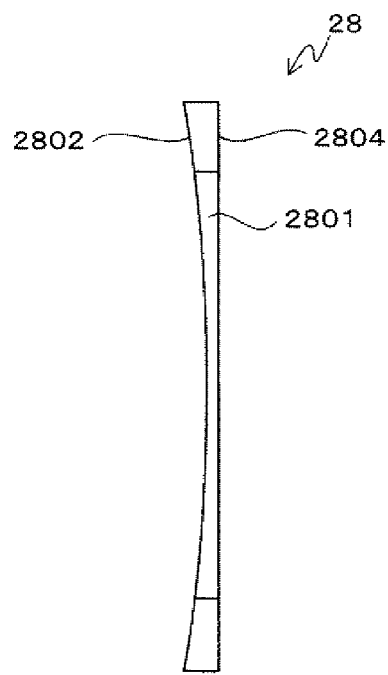
FIG. 11B is a cross-sectional view taken along line B-B in FIG. 11A.
Figure 12:
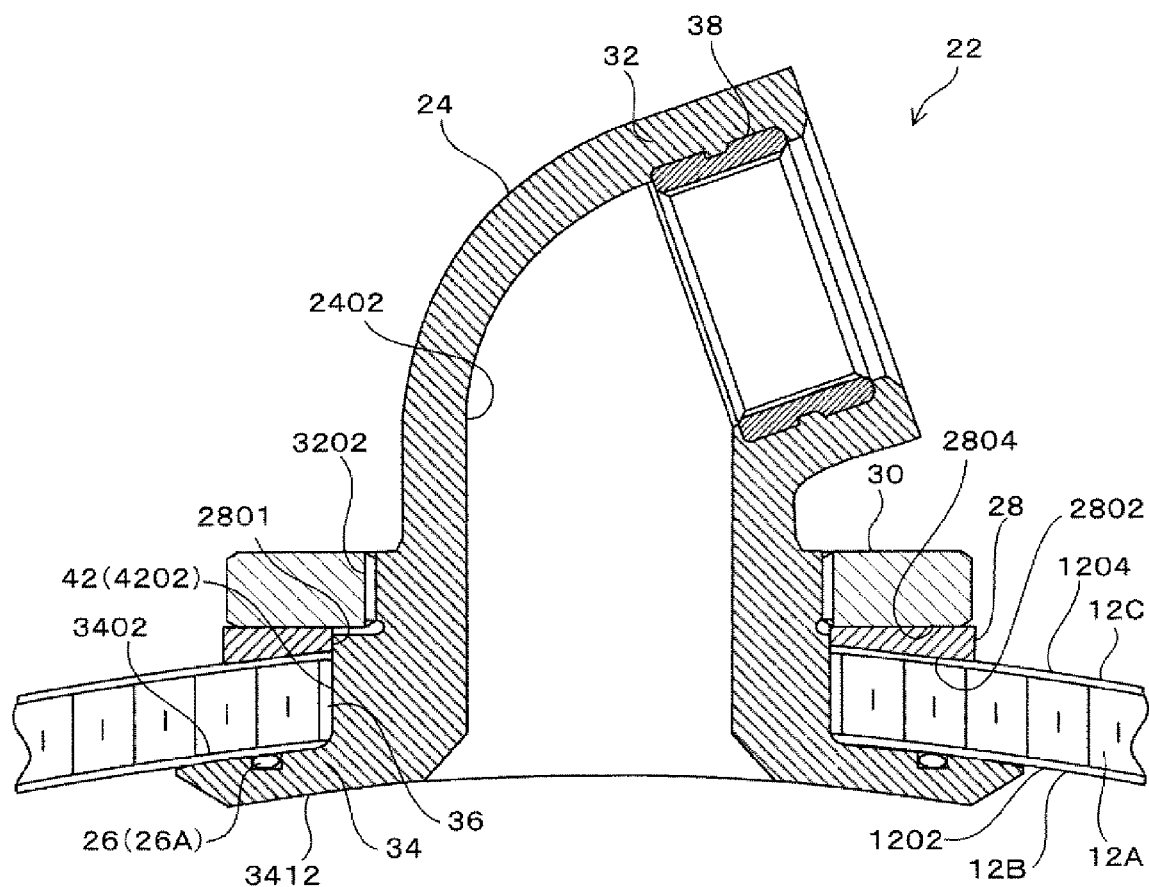
FIG. 12 is a cross-sectional view illustrating a configuration of a piping nozzle according to a fourth embodiment.
Figure 13A:
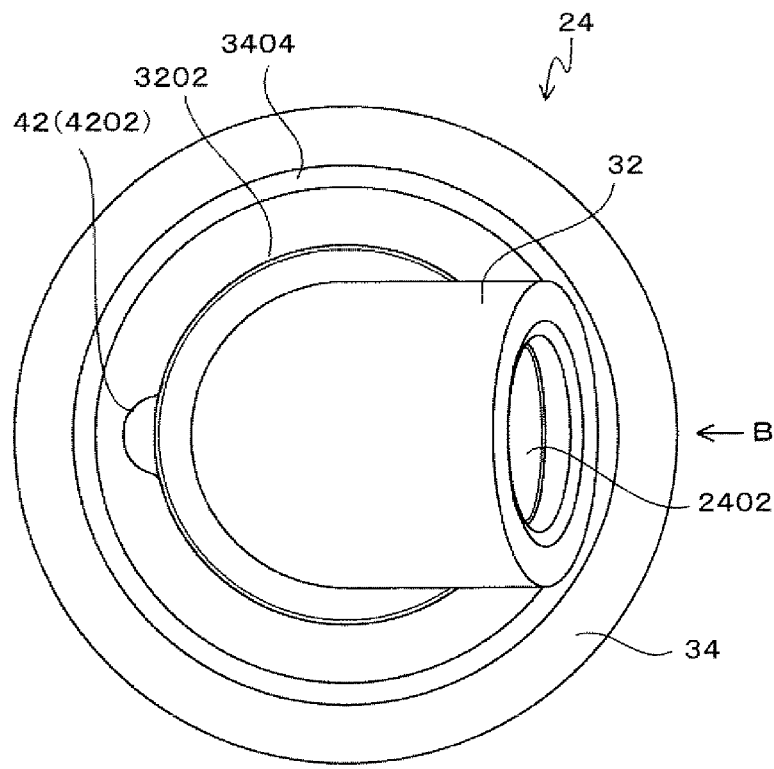
FIG. 13A is a plan view of a nozzle body according to the fourth embodiment.
Figure 13B:
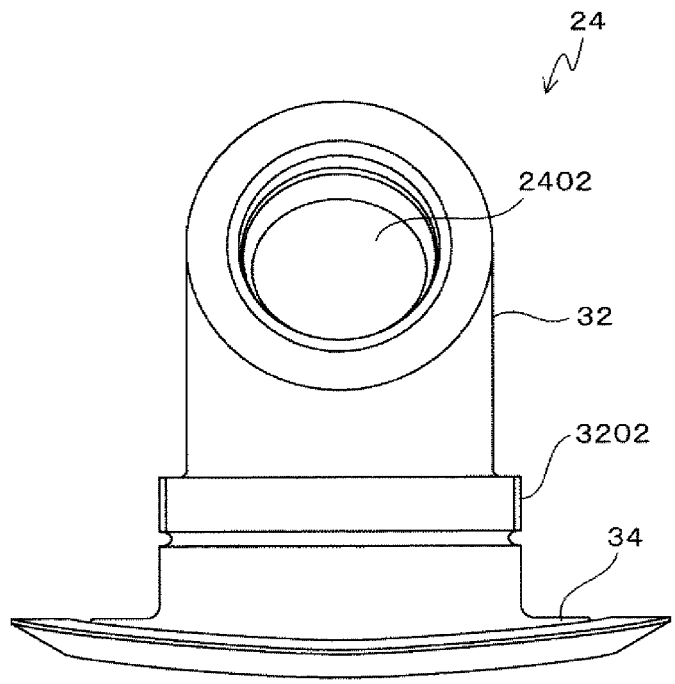
FIG. 13B is a perspective view along arrow B in FIG. 13A.
Figure 14A:
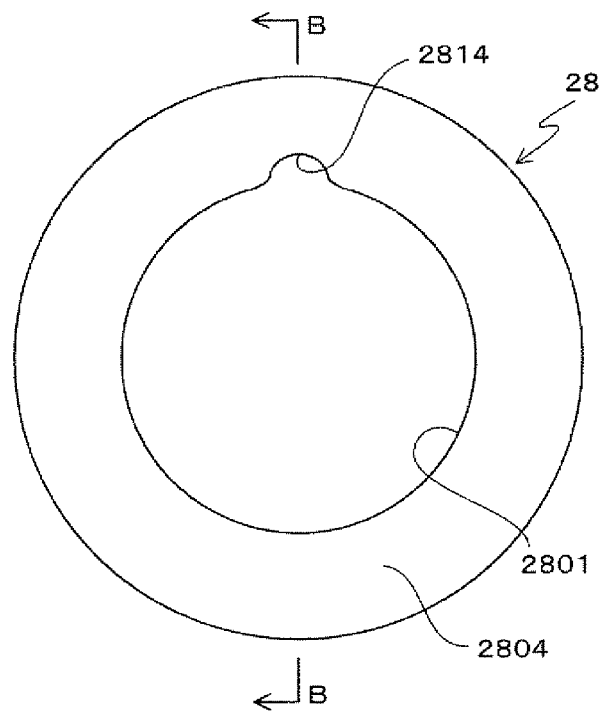
FIG. 14A is a plan view of a spacer member according to the fourth embodiment.
Figure 14B:
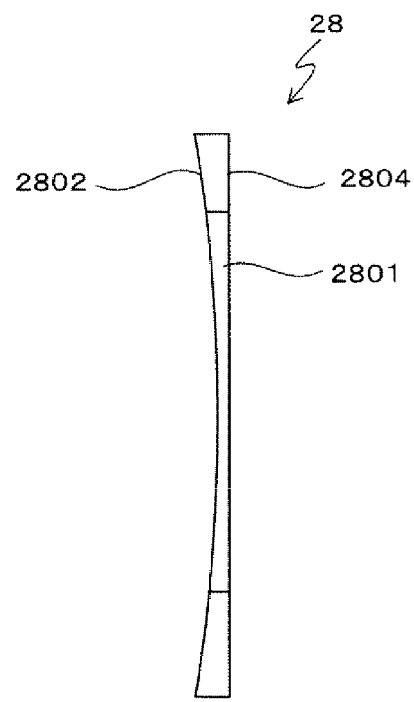
FIG. 14B is a cross-sectional view taken along line B-B in FIG. 14A.

Specifically, as illustrated in FIG. 8, an inner circumferential surface side engaging portion 40 is provided in the inner circumferential surface of the nozzle body insertion hole 36.

In the present embodiment, the inner circumferential surface side engaging portion 40 is constituted of a plurality (four) of recesses 4002 provided at positions at a spacing in a circumferential direction in the inner circumferential surface of the nozzle body insertion hole 36.

An outer circumferential surface side engaging portion 42 engageable with the inner circumferential surface side engaging portion 40 is provided on an outer circumferential surface of the cylinder 32 of the nozzle body 24.

In the present embodiment, the outer circumferential surface side engaging portion 42 is constituted of a plurality (four) of protrusions 4202 provided at positions at a spacing in a circumferential direction on the outer circumferential surface of the cylinder 32.

In the second embodiment, the nozzle body 24 is attached to the portion of the tank body 12 in the same manner as in the first embodiment, the portion of the tank body 12 around the nozzle body insertion hole 36 is sandwiched by the skirt side abutting surface 3402 and the spacer member side abutting surface 2802, the inner circumferential surface side engaging portion 40 and the outer circumferential surface side engaging portion 42 engage, and the rotation of the nozzle body 24 within the nozzle body insertion hole 36 is stopped.

Note that the surfaces of the plurality of protrusions 42 that face the spacer member side abutting surface 2802 are positioned at locations displaced more to the inner side in the radial direction of the tank body 12 than the outer surface 1204 of the tank body 12 in order to allow for more reliable sandwiching of the portion of the tank body 12 around the nozzle body insertion hole 36 by the skirt side abutting surface 3402 and the spacer member side abutting surface 2802.

According to the second embodiment, it is obvious that the same beneficial effects as in the first embodiment are provided. Moreover, the rotation of the cylinder 32 of the nozzle body 24 within the nozzle body insertion hole 36 is reliably stopped due to the engagement of the inner circumferential surface side engaging portion 40 in the nozzle body insertion hole 36 and the outer circumferential surface side engaging portion 42 on the cylinder 32.

Accordingly, the nozzle body 24 is accurately positioned with respect to the tank body 12 around the axis of the nozzle body 24, which is advantageous from the perspective of improving the efficiency of the work of attaching the nozzle body 24 to the tank body 12.

Additionally, according to the second embodiment, the inner circumferential surface side engaging portion 40 is constituted of the plurality of recesses 4002 provided at positions at a spacing in the circumferential direction in the inner circumferential surface of the nozzle body insertion hole 36; and the outer circumferential surface side engaging portion 42 is constituted of the plurality of protrusions 4202 engageable with the plurality of recesses 4002 and provided at positions at a spacing in the circumferential direction on the outer circumferential surface of the cylinder 32.

Accordingly, the rotation of the cylinder 32 of the nozzle body 24 within the nozzle body insertion hole 36 is reliably stopped with a simple structure, which is advantageous.

Third Embodiment

Next, a third embodiment will be described with reference to FIGS. 9 to 11B.

The third embodiment is a modified example of the second embodiment, this explanation shall emphasize differences from the second embodiment. Therefore, portions and members that are the same as in the second embodiment are assigned the same reference numerals and their explanations shall be omitted.

In the second embodiment, the inner circumferential surface side engaging portion 40 is constituted by four of the recesses 4002, and the outer circumferential surface side engaging portion 42 is constituted by four of the protrusions 4202. In contrast, the third embodiment differs from the second embodiment in that the inner circumferential surface side engaging portion 40 is constituted by two of the recesses 4002, and the outer circumferential surface side engaging portion 42 is constituted by two of the protrusions 4202.

That is, the numbers of the recesses 4002 and the protrusions 4202 have been reduced in accordance with the rotational torque applied to the nozzle body 24 at a time of piping to the piping nozzle 22, and this reduction of the numbers is advantageous from the perspectives of eliminating fabrication labor and reducing costs.

Additionally, the shape of the skirt 34 of the nozzle body 24 differs from those in the first and second embodiments.

Specifically, in the first and second embodiments, the skirt 34 includes the skirt side abutting surface 3402 formed with a cylindrical surface of a curvature substantially the same as the inner surface 1202 of the cylindrical section 18 and abuttable against the inner surface 1202 of the tank body 12 around the nozzle body insertion hole 36. Additionally, the surface of the skirt 34 exposed to the interior of the tank body 12 while the nozzle body 24 is attached to the tank body 12 is formed as a flat surface. That is, the portion of the skirt 34 positioned on the side opposite the skirt side abutting surface 3402 is formed as a flat surface.

In contrast, in the third embodiment, while the skirt 34 includes the skirt side abutting surface 3402 abuttable against the inner surface 1202 of the tank body 12 around the nozzle body insertion hole 36 as in the first and second embodiments, the portion of the skirt 34 positioned on the side opposite the skirt side abutting surface 3402 is formed with a cylindrical surface 3412 with the same axial center as the skirt side abutting surface 3402.

That is, in the third embodiment, the wall thickness of the skirt 34 is made uniform, which is advantageous from the perspective of reducing the weight of the fluid tank 10.

Additionally, in the third embodiment, as in the first and second embodiments, the spacer member 28 includes the spacer member side abutting surface 2802 abuttable against the outer surface 1204 of the tank body 12 around the nozzle body insertion hole 36, and the flat nut side abutting surface 2804 positioned opposite the spacer member side abutting surface 2802 and abuttable against the nut 30.

However, the spacer member 28 of the third embodiment is thinner than that in the first and second embodiments, so as to reduce the weight of the fluid tank 10.

Additionally, the recess 2814 engageable with the two protrusions 4202 is provided at two locations that are spaced in the circumferential direction of the inner circumferential surface of the center hole 2801 in the spacer member 28.

Note that in a state where the spacer member side abutting surface 2802 is mounted on the outer surface 1204 of the tank body 12 and the recesses 2814 and the protrusions 42 are engaged, the surfaces of the protrusions 4202 facing the nut 30 are positioned at locations displaced more to the inner side in the radial direction of the tank body 12 than the nut side abutting surface 2804 in order to allow for more reliable sandwiching of the portion of the tank body 12 around the nozzle body insertion hole 36 by the skirt side abutting surface 3402 and the spacer member side abutting surface 2802. As a result, a configuration is given in which the attachment of the nozzle body 24 is strengthened when the portion of the tank body 12 around the nozzle body insertion hole 36 is sandwiched by the skirt side abutting surface 3402 and the spacer member side abutting surface 2802.

Fourth Embodiment

Next, a fourth embodiment will be described with reference to FIGS. 12 to 14B.

The fourth embodiment is a modified example of the third embodiment, this explanation shall emphasize differences from the third embodiment. Therefore, portions and members that are the same as in the third embodiment are assigned the same reference numerals and their explanations shall be omitted.

The fourth embodiment differs from the third embodiment in that the inner circumferential surface side engaging portion 40 is constituted by one recess 4002, and the outer circumferential surface side engaging portion 42 is constituted by one protrusion 4202.

That is, the numbers of the recesses 4002 and the protrusions 4202 have been reduced in accordance with the rotational torque applied to the nozzle body 24 at a time of piping to the piping nozzle 22, and this reduction of the numbers is advantageous from the perspectives of eliminating fabrication labor and reducing costs.

Additionally, in the fourth embodiment, as in the third embodiment, the portion of the skirt 34 positioned on the side opposite the skirt side abutting surface 3402 is formed with the cylindrical surface 3412 with the same axial center as the skirt side abutting surface 3402, and the wall thickness of the skirt 34 is made uniform, which is advantageous from the perspective of reducing the weight of the fluid tank 10.

Additionally, as in the third embodiment, the recess 2814 engageable with the protrusion 4202 is provided at one location that is spaced in the circumferential direction of the inner circumferential surface of the center hole 2801 in the spacer member 28, so as to strengthen the attachment of the nozzle body 24.

Additionally, the surface of the protrusion 4202 facing the nut 30 is positioned at a location displaced more to the inner side in the radial direction of the tank body 12 than the nut side abutting surface 2804, so as to strengthen the attachment of the nozzle body 24.

Note that in the fourth embodiment, an intermediate portion of the cylinder 32 between a front portion and a base portion is formed in a curved manner. The front portion of the cylinder 32 includes the female screw member 38 provided thereon. The base portion of the cylinder 32 includes the male screw 3202 provided thereon.

The invention claimed is:

1. A structure of a nozzle for piping to be provided in a tank body of a fluid tank, the structure comprising:
    a nozzle body including:
        a cylinder inserted through an interior and an exterior of the tank body via a nozzle body insertion hole in the tank body and including a male screw formed in a portion exposed to an exterior of the tank body; and
        a skirt expanding annularly from an end portion of the cylinder in an interior of the tank body;
    a sealing member interposed between an inner surface of the tank body and the skirt around a periphery of the nozzle body insertion hole; and
    a spacer member with an annular shape disposed around the cylinder on an outer surface of the tank body;
    a portion of the tank body around the nozzle body insertion hole being sandwiched by the skirt and the spacer member due to a nut being tightened onto the male screw; wherein:
    the skirt includes a skirt side abutting surface abuttable against the inner surface of the tank body around the nozzle body insertion hole; and
    a portion of the skirt positioned on a side opposite the skirt side abutting surface is formed with a cylindrical surface with a same axial center as the skirt side abutting surface.

2. The structure of a nozzle for fluid tank piping according to claim 1, wherein:
    the sealing member is disposed between the inner surface of the tank body and the skirt side abutting surface;
    the spacer member includes a spacer member side abutting surface abuttable against the outer surface of the tank body around the nozzle body insertion hole; and
    sandwiching of the portion of the tank body around the nozzle body insertion hole is done by the skirt side abutting surface and the spacer member side abutting surface.

3. The structure of a nozzle for fluid tank piping according to claim 2, wherein:
    the tank body includes a cylindrical section and dome sections provided on both sides of the cylindrical section;
    the nozzle body insertion hole is provided in the cylindrical section;
    the skirt side abutting surface is formed with a cylindrical surface of a same curvature as the inner surface of the cylindrical section; and
    the spacer member side abutting surface is formed with a cylindrical surface of a same curvature as the outer surface of the cylindrical section.

4. The structure of a nozzle for fluid tank piping according to claim 2, wherein:
    the sealing member is an O-ring;
    a groove extending annularly around the cylinder is defined in the skirt side abutting surface; and
    the O-ring is fitted into the groove.

5. The structure of a nozzle for fluid tank piping according to claim 2, wherein:
    the sealing member is an annular plate-like rubber sheet having a uniform thickness and extending annularly between the inner surface of the tank body and the skirt side abutting surface.

6. The structure of a nozzle for fluid tank piping according to claim 2, wherein:
    the spacer member includes a flat nut side abutting surface positioned opposite the spacer member side abutting surface and abuttable against the nut.

7. The structure of a nozzle for fluid tank piping according to claim 1, wherein:
    an inner circumferential surface side engaging portion is provided in an inner circumferential surface of the nozzle body insertion hole; and
    an outer circumferential surface side engaging portion configured to engage with the inner circumferential surface side engaging portion and stop rotation of the cylinder within the nozzle body insertion hole is provided on the outer circumferential surface of the cylinder.

8. The structure of a nozzle for fluid tank piping according to claim 7, wherein:

the inner circumferential surface side engaging portion is constituted by a recess provided in the inner circumferential surface of the nozzle body insertion hole; and the outer circumferential surface side engaging portion is constituted by a protrusion provided on the outer circumferential surface of the cylinder and engageable with the recess.

9. The structure of a nozzle for fluid tank piping according to claim 8, wherein:

a plurality of the recesses are provided at a spacing in a circumferential direction of the inner circumferential surface of the nozzle body insertion hole; and a plurality of the outer circumferential surface side engaging portions are provided at a spacing in a circumferential direction of the outer circumferential surface of the cylinder and engageable with the plurality of the recesses.

10. The structure of a nozzle for fluid tank piping according to claim 8, wherein:

the spacer member includes a center hole for which the cylinder is inserted through a center of the spacer member; and a recess engageable with the protrusion constituting the outer circumferential surface side engaging portion is provided on an inner circumferential surface of the center hole.

* * * * *